(12) United States Patent
Brossier et al.

(10) Patent No.: US 11,231,265 B2
(45) Date of Patent: Jan. 25, 2022

(54) SYSTEM FOR MEASURING A BENDING DEFORMATION OF A SURFACE OF A MATERIAL

(71) Applicant: SAFRAN AIRCRAFT ENGINES, Paris (FR)

(72) Inventors: Pascal Noel Brossier, Moissy-Cramayel (FR); Pierre Bouissou, Moissy-Cramayel (FR); Joseph Henry, Moissy-Cramayel (FR); Remy Muller, Moissy-Cramayel (FR); Quentin Pujol D'Andrebo, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 169 days.

(21) Appl. No.: 16/796,753

(22) Filed: Feb. 20, 2020

(65) Prior Publication Data
US 2020/0271433 A1 Aug. 27, 2020

(30) Foreign Application Priority Data

Feb. 21, 2019 (FR) ...................................... 1901727

(51) Int. Cl.
*G01B 5/00* (2006.01)
*G01B 5/30* (2006.01)
(Continued)

(52) U.S. Cl.
CPC ................ *G01B 5/30* (2013.01); *G01B 5/16* (2013.01); *G01B 5/20* (2013.01); *G01N 3/20* (2013.01)

(58) Field of Classification Search
CPC ... G01B 5/30; G01B 5/16; G01B 5/20; G01N 3/20
See application file for complete search history.

(56) References Cited

U.S. PATENT DOCUMENTS 3,056,209 A * 10/1962 Oliver ...................... G01C 7/00
33/523
4,084,324 A * 4/1978 Whitehouse ............. G01B 7/28
33/504
(Continued)

FOREIGN PATENT DOCUMENTS

CN 209264425 U * 8/2019
DE 1473646 A1 10/1969
(Continued)

OTHER PUBLICATIONS

Preliminary Research Report received for French Application No. 1901727, dated Sep. 3, 2019, 5 pages (1 page of French Translation Cover Sheet and 4 pages of original document).

*Primary Examiner* — Jamel E Williams
(74) *Attorney, Agent, or Firm* — Womble Bond Dickinson (US) LLP

(57) ABSTRACT

A system for measuring a bending deformation of a surface of a material which cooperates with a bending test machine to deform a test piece. The system includes a first portion with lateral teeth which bear against an upper surface of the test piece. A first load support connected to the lateral teeth applies a constant force towards the test piece. A second portion with a central tooth bears against the upper surface. A second load support connected to the central tooth applies a constant force oriented towards the test piece. A measuring device includes a deformation sensor having a first arm connected to the first portion, and a second arm connected to the second portion. The first arm and the second arm are separated from each other by a variable distance ($\Delta B$) measured by the measuring device.

11 Claims, 7 Drawing Sheets

(51) Int. Cl.
*G01B 5/16* (2006.01)
*G01B 5/20* (2006.01)
*G01N 3/20* (2006.01)

(56) References Cited

U.S. PATENT DOCUMENTS

| | | | | |
|---|---|---|---|---|
| 4,903,413 | A * | 2/1990 | Bellwood | G01B 5/207 |
| | | | | 33/551 |
| 4,914,828 | A * | 4/1990 | Fiedor | G01B 7/293 |
| | | | | 33/551 |
| 5,083,465 | A * | 1/1992 | Myers | G01B 5/30 |
| | | | | 33/790 |
| 5,535,143 | A * | 7/1996 | Face | G01B 5/201 |
| | | | | 33/523 |
| 6,568,096 | B1 * | 5/2003 | Svitkin | B23Q 1/76 |
| | | | | 33/501.02 |
| 6,912,478 | B1 * | 6/2005 | Face, III | G01B 7/281 |
| | | | | 33/523 |
| 2018/0112976 | A1 * | 4/2018 | Marmy | G01B 21/32 |

FOREIGN PATENT DOCUMENTS

| | | | | |
|---|---|---|---|---|
| DE | 3714185 A1 * | 11/1988 | | G01B 5/30 |
| DE | 3714185 A1 | 11/1988 | | |
| JP | 62-034002 A | 2/1987 | | |
| WO | 2011/069219 A1 | 6/2011 | | |
| WO | WO-2011069219 A1 * | 6/2011 | | B23Q 17/20 |
| WO | 2014/104983 A1 | 7/2014 | | |
| WO | WO-2014104983 A1 * | 7/2014 | | G01N 3/068 |

\* cited by examiner

SYSTEM FOR MEASURING A BENDING DEFORMATION OF A SURFACE OF A MATERIAL

TECHNICAL FIELD OF THE INVENTION

The present invention relates to the field of bending tests of mechanical parts, and more particularly the measurement of the bending deformation of a surface of these parts during the implementation of such tests.

STATE OF THE ART

Bending tests are commonly used in the industry in order to fatigue test the surface of materials. In other words, these tests allow studying the bending mechanical strength of the surface of materials. The material to be studied is typically in the form of a test piece, the dimensions of which are adapted to those of testing machines.

These tests are generally force controlled. One problem with force controlling is that, however, the amplitude of deformation increases during the test.

A solution to this problem is to control the deformation tests. Measuring the curvature of the test piece when it deforms requires at least two sensors, typically LVDT (linear variable differential transformer) sensors spaced apart to measure the displacement of the test piece at two points. Calculating the difference between these two measurements allows obtaining the value of the curvature. However, the spaces existing in current testing machines are too small to be able to insert these sensors.

To overcome this problem, it is known to attach sensors, in the form of deformation gauges, directly on the test piece. However, these gauges are sensitive to temperature, which can make them unusable depending on the thermal conditions of the tests, and have a lifetime generally shorter than the lifetime of the test.

It is possible to use a device, generally called "strain gage", comprising arms spaced apart from each other, called "keys", provided with sensors and configured to come into contact with the test piece. The proximity of the sensors to the test piece does not, however, solve the problem of performing high temperature tests.

An example of a strain gage is that sold by the company METCUT. It comprises curved keys, including one upper key with a contact point at the center of the upper surface of the test piece, and two lower keys with two contact points spaced on the lower surface of the test piece. The body of the strain gage is attached to the fixed portion of the mounting. One disadvantage is that during the overall displacement of the test piece, the strain gage has a rotational movement which introduces an error in measuring the curvature.

BRIEF DESCRIPTION OF THE INVENTION

A purpose of the invention is to propose a system for measuring a bending deformation of a surface of a mechanical part, which overcomes the constraints of the state of the art, by allowing to perform reliable and accurate measurements, throughout the duration of the bending tests, regardless of the experimental conditions to which the test piece is subjected during these bending tests.

The high quality level of the measurements allows controlling the deformation test under different deformation ratios in particular minus 1. That is to say performing the positive negative alternated deformation which allows determining the number of incipient crack cycles.

To this end, the invention relates to a system adapted to cooperate with a bending test machine provided with a four-point bending mounting allowing to deform a test piece of said material, said measurement system comprising:
 a first portion comprising:
  lateral teeth each comprising an end, configured to bear against an upper surface of the test piece via said ends in two respective lateral bearing areas,
  a first load support connected to the lateral teeth, configured to apply to said lateral teeth a constant force oriented towards the test piece,
  the first portion being movable in translation along an axis perpendicular to the plane of the upper surface of the test piece,
 a second portion comprising:
  a central tooth parallel to the lateral teeth comprising an end, configured to bear against the upper surface of the test piece via said end in a central bearing area arranged between the lateral bearing areas,
  a second load support connected to the central tooth, configured to apply to said central tooth a constant force oriented towards the test piece,
  the second portion being movable in translation relative to the first portion along an axis parallel to the axis of the first portion,
 a measuring device comprising a deformation sensor, the deformation sensor comprising:
  a first arm connected to the first portion,
  a second arm connected to the second portion,
 wherein the first arm and the second arm are separated from each other by a variable distance, the measuring device being configured to measure said variable distance corresponding to a distance ($\Delta L$) between the end (33) of the central tooth (32) and the ends (13) of the lateral teeth (12) during the deformation of the test piece.

The two portions of the system are movable in translation relative to the test piece and relative to one another, and displace as the upper surface of the test piece deforms.

The measuring device is linked to each of the first and second portions of the system.

The relative spacing between the central tooth and the lateral teeth is measured by the measuring device during the test and gives a deformation measurement of the upper surface of the test piece of the studied material.

A reliable and repeatable deformation measurement is then obtained, while preserving the integrity of the sensor which is remote from the test piece. Then, it becomes possible to perform bending deformation tests at high temperature without risking degrading the sensor.

In the present text, the terms "upper" and "lower", "high" and "low", or other related terms which designate a position, an arrangement, or a direction, must be understood according to a current use of the bending deformation mounting and of the measurement system. In current use of the measurement system, a test piece taken from the material to be characterized and machined to standardized dimensions is positioned substantially perpendicularly to a bearing plane of the system, which is typically the ground, the surface of the test piece, the deformation of which is studied, being called "upper surface" or "exposed surface", and the surface of the test piece opposite to the upper surface being called "lower surface" or "bearing surface".

The various constituent elements of the measurement system will thus be designated with reference to the terms "upper" and "lower" as defined above.

According to other aspects, the proposed measuring device has the following different characteristics taken alone or according to their technically possible combinations:

The end of the lateral teeth and/or the end of the central tooth bearing against the upper surface of the test piece are beveled. The bearing of the teeth on the test piece is thus linear, which allows not to degrade the surface of the test piece, unlike pointed ends which tend to dig holes in said surface, which can form an incipient rupture.

The lateral teeth are connected to a hollow tube which extends along an axis perpendicular to the plane of the upper surface of the test piece, and the central tooth is in the form of a rod coaxial with the tube, capable of protruding axially out of the tube from a lower end of said tube, the central tooth being configured to displace in translation inside said tube.

The first load support is connected to the tube, the second load support is connected to an upper portion of the rod capable of protruding axially out of the tube from an upper end of said tube, the first arm of the deformation sensor is connected to the tube, and the second arm of the deformation sensor is connected to the upper portion of the rod.

the first load support comprises a balancer comprising a bar which extends perpendicularly to the axis of translation of the first portion, and masses mounted at the ends of the bar, the second load support comprises a balancer comprising a bar which extends perpendicularly to the axis of translation of the second portion, and masses mounted at the ends of the bar, and the masses of the first load support and the second load support are configured so that the center of gravity of the balancers and the deformation sensor is aligned with the central tooth.

The measurement system further comprises a hollow structure comprising a side wall delimiting an internal volume open in two orifices located at an upper portion and a lower portion of the structure, said structure being configured to at least partially house the first portion and the second portion of the system in its internal volume, and the upper portion of the structure being configured to be connected to a bending surface deformation machine and the lower portion of the structure being configured to be connected to the four-point bending mounting.

The side wall of the structure comprises two through openings facing one another, delimited by an edge of the wall, and through which extend the balancers of the first load support and of the second load support, the balancer of the first load support comprises bearings configured to roll along the edges of the openings when the first portion displaces, and the balancer of the second load support comprises bearings configured to roll along the edges of the openings when the second portion displaces.

The measurement system further comprises a centering plug arranged in the opening of the lower portion of the structure, the centering plug being configured to guide the first portion in translation.

The first portion comprises a support comprising two support portions held together so as to enclose a portion of the lateral teeth.

The measuring device comprises a strain gage comprising the first arm and the second arm, said first and second arms being parallel to each other when the distance between the end of the central tooth and the ends of the lateral teeth is zero.

The invention also relates to a system for testing the bending deformation of a surface of a material in the form of a test piece, comprising:
a bending test machine provided with a four-point bending mounting, said testing machine being configured to apply a bending deformation constraint to the test piece by means of the four-point mounting in order to deform the test piece in bending,
a measurement system as described above, allowing to measure the surface bending deformation of the upper surface of the test piece according to the deformation constraint applied by the testing machine.

DESCRIPTION OF THE FIGURES

To this end, the present invention relates to a system . . . .

Other advantages and characteristics of the invention will become apparent upon reading the following description given by way of illustrative and non-limiting example, with reference to the appended figures which show.

DETAILED DESCRIPTION OF EMBODIMENTS OF THE INVENTION

A first object of the invention relates to a system for measuring a bending deformation of a surface of a material.

The measurement system is integrated into a bending surface deformation test system, in which it is configured to cooperate with a bending test machine and a four-point bending mounting allowing to deform a test piece of said material.

The principle of a four-point mounting is as follows. During a bending deformation test, a testing machine imposes via a force cell a mechanical constraint on a useful central portion of the upper surface of the test piece at two pressure points, while lateral portions of the lower surface are supported on the two other bearing points of the mounting.

The test piece thus deforms under mechanical constraint. The upper surface whose deformation is studied thus undergoes a compressive constraint, while the lower surface undergoes a traction constraint.

Compared to a three-point bending test, the four-point bending test provides the advantage of not constraining the test piece at the rupture area, which allows not to damage the test piece and to keep a constant constraint on the surface of the useful portion of the test piece.

An embodiment of the measurement system will now be described with reference to FIGS. 1 to 9.

Figure 1:
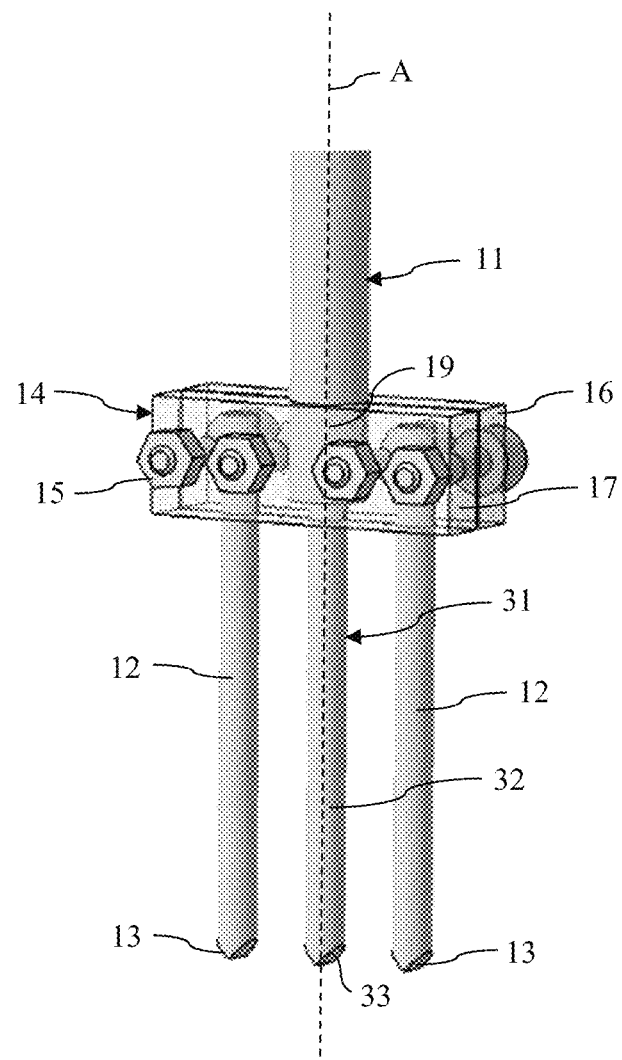
FIG. 1, a perspective view of the central and lateral teeth of the measurement system.

With reference to FIG. 1, the measurement system 1 comprises a hollow tube 11 which extends along an axis A substantially perpendicular to the upper surface 71 of the test piece at rest. The test piece 70 is said to be "at rest" when no mechanical constraint is applied thereto, typically before performing a bending deformation test.

The measurement system 1 also comprises a support 14 to which a lower portion 19 of the tube is fastened. According to one embodiment, the support 14 is composed of two portions 16 and 17 configured to come into contact with one another in order to enclose the lower portion of the tube in the internal volume of the support thus formed. The two support portions 16 and 17 are held together by any suitable clamping means, preferably by clamping screws 15.

The support 14 extends substantially transversely, that is to say perpendicularly to the axis A. The support preferably has a square or rectangular section, and forms a rectangular parallelepiped whose length extends in transverse direction and width extends in the axial direction, that is to say parallel to the axis A.

The system 1 further comprises a rod 31 housed inside the tube 11, and configured to displace in translation along the tube, and relative to said tube, along the axis A.

The rod 31 protrudes axially out of the tube from the upper and lower ends of the tube, and thus defines an upper portion and a lower portion of the rod.

The lower portion of the rod which protrudes from the tube forms a central tooth 32. The central tooth 32 extends downwards, in the direction of the test piece, from the support 14. The central tooth 32 is provided with an end 33 configured to bear against the upper surface 71 of the test piece in a central bearing area 72.

The system 1 also comprises lateral teeth 12. The lateral teeth 12 are preferably rods whose structure is similar to that of the central tooth 32. The lateral teeth 12 are fastened to the support 14, and extend parallel to the central tooth 32 from the support downwards in the direction of the test piece.

The lateral teeth 12 are fastened to the support preferably by the clamping screws 15 which ensure both maintaining the lateral teeth in a fixed position relative to the support and holding the two support portions 16 and 17 together.

The end 13 of the lateral teeth 12 is configured to bear against the upper surface 71 of the test piece in respective lateral bearing areas 73 arranged on either side of the central bearing area 72.

According to the embodiment illustrated in FIG. 1, the assembly comprising the rod 31 provided with the central tooth 32, the lateral teeth 12, and the tube 11, form a fork, also designated as a "deformation probe", configured to bear against the upper surface 71 of the test piece 70. The fork remains in contact with the exposed surface via its central 32 and lateral teeth 12 during the deformation of the test piece.

Thus, the fork serves as a physical link between the upper surface 71 and the measuring device 50 described below, and the evolution of the displacement of the central tooth 32 relative to the lateral teeth 12 during the test is measured by the measuring device connected to said teeth, which allows obtaining the bending deformation of the upper surface of the test piece.

Figure 3:
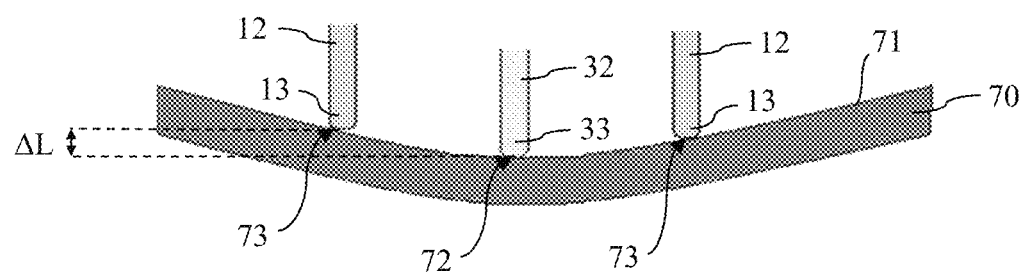
FIG. 3, a schematic view illustrating the bearing areas of the central and lateral teeth on the test piece, the test piece being in a deformed state.

In more detail, FIG. 3 illustrates a differential ΔL which is the distance between the end of the central tooth 32 bearing against the surface in a central bearing area 72 and the end of the lateral teeth 12 bearing against the surface in lateral bearing areas 73. It is this differential ΔL which is measured by the measuring device during a test. The measurement of this differential ΔL depending on the constraint imposed to the test piece during the test allows establishing a bending surface deformation profile of the material constituting the test piece.

Each of the lateral teeth 12 are preferably arranged on either side and at equal distance from the central tooth 32. The lateral teeth 12 thus provide symmetrical lateral bearing areas 73 on the surface 71 of the test piece relative to the central bearing area 72, which makes the contact of all the central and lateral teeth on the test piece uniform and thus improves the accuracy of the measurement.

It is possible to provide more than two lateral teeth, preferably distributed in pairs on either side and at equal distance from the central tooth.

Figure 2:
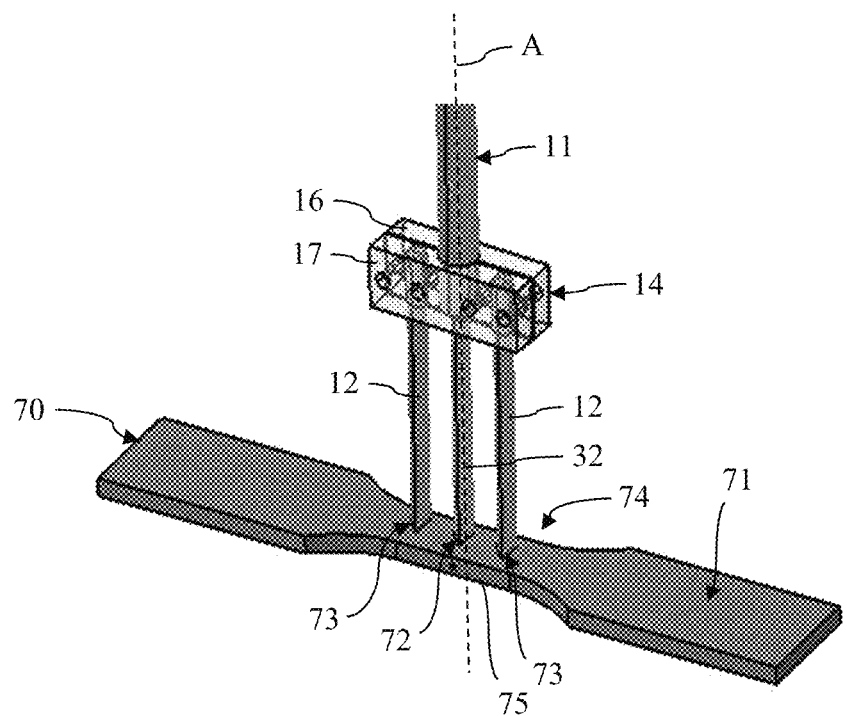
FIG. 2, a perspective view of the central and lateral teeth of the measurement system, bearing on a useful central portion of a test piece.

Advantageously, the end of the central tooth 32 and/or the end of the lateral teeth 12 are beveled. In this way the bearing of the teeth on the surface of the test piece is made in a line. The bevel is made so that the line is perpendicular to the length L of the test piece as can be seen in FIG. 2. This linear bearing allows not to degrade the surface of the test piece, unlike pointed ends which tend to dig holes in said surface, which can form an incipient rupture. Another advantage of this linear bearing is that it allows reducing the contact surface between the teeth and the test piece, ensures that the entire surface of the end of the teeth is in contact with the exposed surface of the test piece. This improves the quality of the contact between the teeth and the test piece, and thus improves the accuracy of the measurement.

Advantageously, the central 32 and/or lateral teeth 12 are produced as consumables. Thus, in the event of degradation of the teeth during the rupture of the test piece, the damaged teeth can be easily replaced by new teeth.

In FIG. 2, the fork contacts a thinned portion 74 of the test piece, called the "useful" portion, in which two recesses 75 have been made. This allows reducing the mechanical strength of the test piece at the useful portion and thus make it more deformable.

The measuring device 1 further comprises a load device for applying a constant load to the central 32 and lateral 12 teeth, in order to allow said teeth to remain in contact with the upper surface 71 of the test piece as the test piece deforms during the test.

The load device comprises a first load support 20 and a second load support 40.

The first load support 20 is connected to the tube 11, preferably to the upper portion 18 of the tube, and allows applying a constant load on said tube in order to force it to displace in translation along the axis A downwards in the direction of the test piece 70, as the upper surface of the test piece deforms. Consequently, the support 14 and the lateral teeth 12 are also forced to displace integrally with the tube 11.

Figure 4:
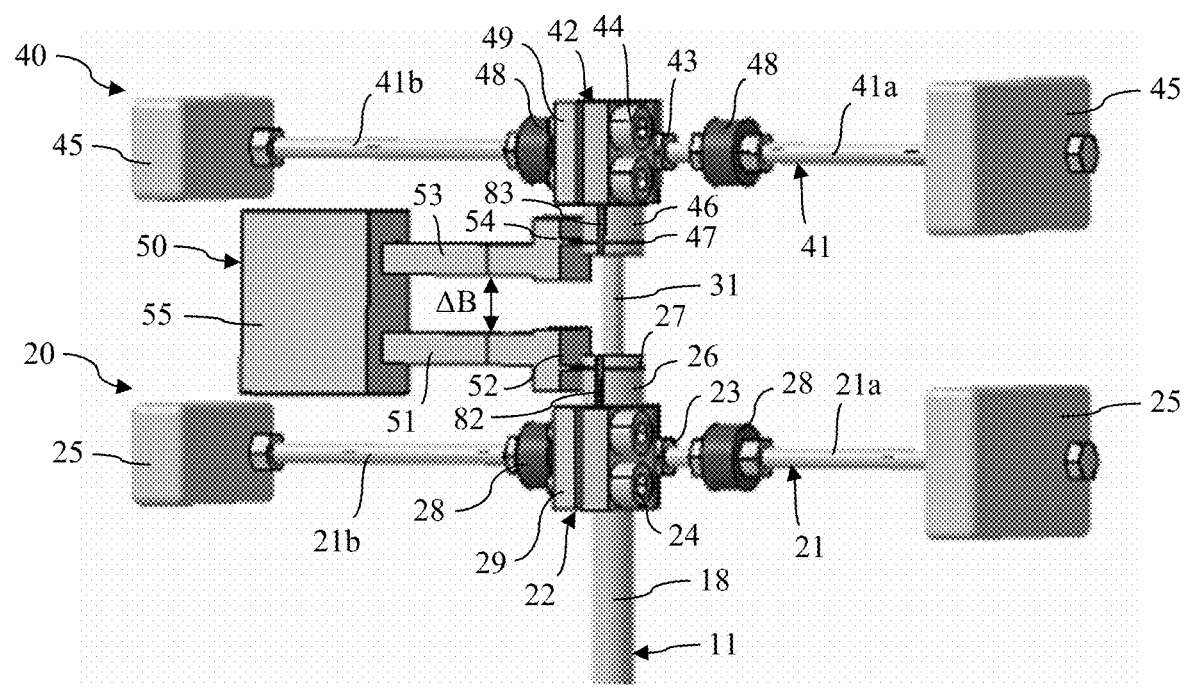
FIG. 4, a perspective view of the load supports and the measuring device.
Figure 5:
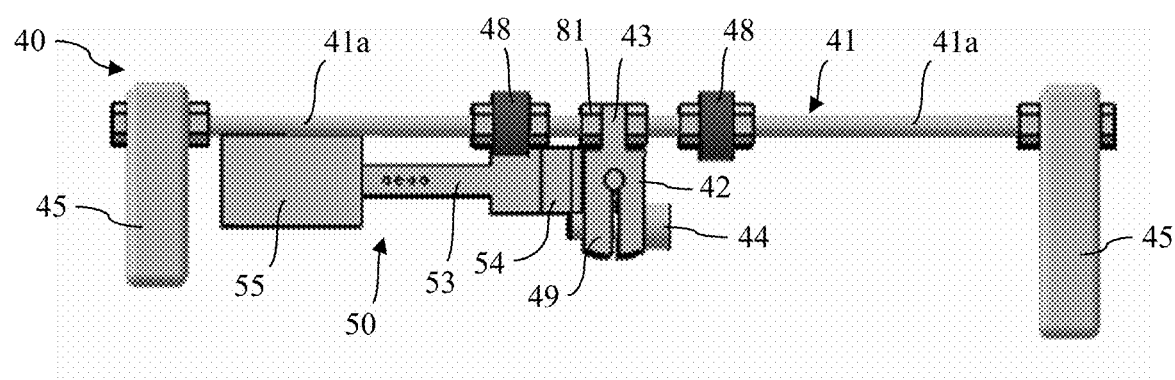
FIG. 5, a top view of the load supports and the measuring device of FIG. 4.
Figure 6:
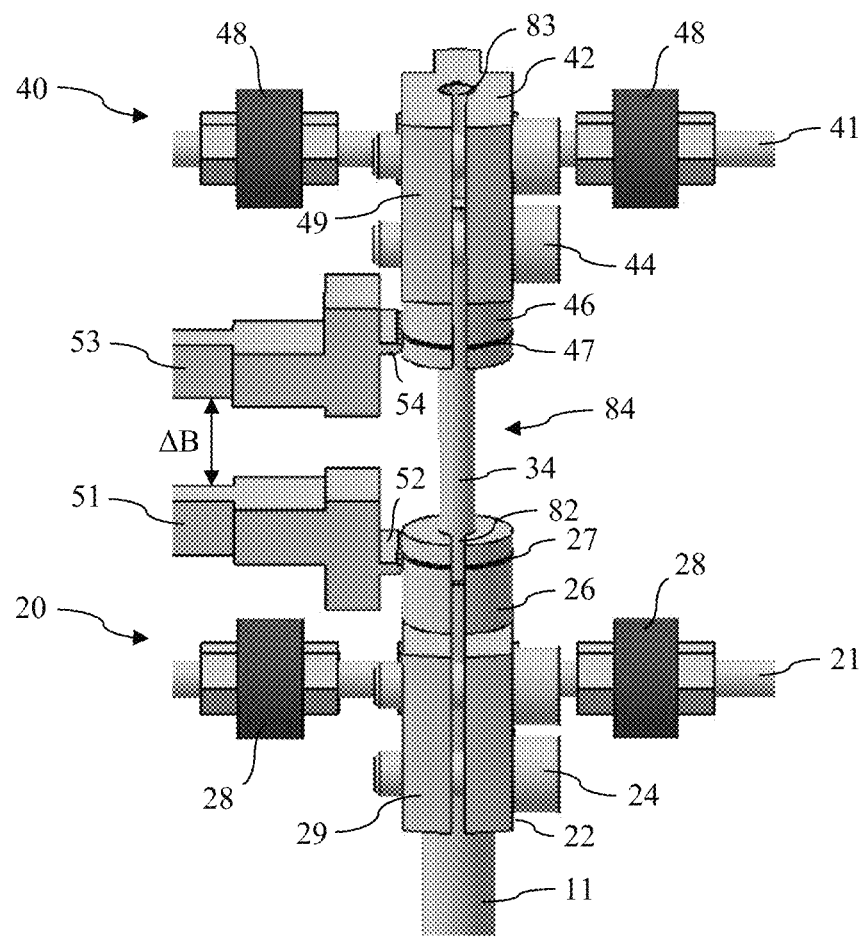
FIG. 6, a close-up perspective view of the load supports and the measuring device of FIG. 4.

With reference to FIGS. 4, 5, and 6, the first load support 20 comprises a bar 21 fastened to the tube 11, positioned substantially perpendicular to the tube. The bar 21 is fastened at its central portion to the tube via a fastening means.

The fastening means preferably comprises a clamp 22 provided with a flange 23 which encloses the central portion of the bar 21, and jaws 29 which enclose the upper portion 18 of the tube, thus allowing the fastening of the bar 21 of the support load to the tube 11. It will be understood that other fastening means are possible, provided that they ensure fastening the bar in a position substantially perpendicular to the tube.

According to one embodiment, the central portion of the bar 21 is threaded, and the fastening means further comprises nuts 80 adapted to be screwed onto the thread of the bar 21 in order to ensure fastening the rod to the flange 23.

The jaws 29 of the clamp are maintained closed on the tube thanks to clamping screws 24.

The bar 21 thus defines two bar portions 21a, 21b which extend on either side of the tube 11, and which have substantially the same length.

According to one embodiment, each of the bar portions 21a, 21b form a full-fledged bar fastened to the clamp 22.

Each of the bar portions 21a, 21b comprise bearings 28. The bearings are rotatably mounted about said bar portions, and are fastened in translation relative to said rod portions.

The first load support 20 further comprises loads 25 allowing to apply a constant load of a determined value to the tube 11.

According to the embodiment shown in FIGS. 4 and 5, the first load support 20 is a balancer load support, in which the loads 25 are in the form of masses positioned at the free ends of the bar 21 to balance the balancer.

The weight of the masses is adjusted in order to impose a determined force on the central tooth 32 allowing to maintain the central tooth bearing against the upper surface 71 of the test piece during the test.

The means for fastening the bar 21 to the tube 11 also comprises a cylindrical part 26 which surmounts the clamp 22. The cylindrical part 26 extends from the upper surface of the clamp, around the upper portion 18 of the tube including the end of the tube. The cylindrical part 26 is advantageously provided with a bore 82 in which the upper portion 34 of the rod 31 is received, and which thus allows said rod 31 to be guided in the tube 11 so that it does not rub against the inner wall of the tube.

The cylindrical part 26 is provided with a groove 27 configured to receive the spout 52 of the lower arm 51 of the measuring device 50 which will be described in more detail below.

The second load support 40 is connected to the rod 31, preferably to the upper portion 34 of the rod, and allows applying a constant load on said rod in order to force it to displace in translation along the axis A towards the bottom, in the direction of the test piece, as the upper surface of the test piece deforms.

The second load support 40 comprises a bar 41 fastened to the rod 31, positioned substantially perpendicularly to said rod. The bar 41 is fastened at its central portion to the rod 31 of the fork via a fastening means.

The fastening means preferably comprises a clamp 42 provided with a flange 43 which encloses the central portion of the bar 41, and jaws 49 which enclose the upper portion 31 of the rod, thus allowing the fastening of the bar 41 of the load support to the rod 31. It will be understood that other fastening means are possible, provided that they allow fastening the bar 41 of the second load support in a position substantially perpendicular to the rod 31.

According to one embodiment, the central portion of the bar 41 is threaded, and the fastening means further comprises nuts 81 adapted to be screwed onto the thread of the bar 41 in order to ensure fastening said bar to the flange.

The jaws 49 of the clamp are maintained closed on the rod 31 thanks to clamping screws 44.

The axial positioning of the clamp 42 along the rod 31, or height of the clamp, is adjusted in the desired manner, then the clamp 42 is fastened to the rod 31, particularly by the nuts 81.

The bar 41 of the second load support thus defines two bar portions 41a, 41b which extend on either side of the rod 31, and which have substantially the same length.

According to one embodiment, the bar portions 41a, 41b each form a full-fledged bar mounted on the clamp 42.

The bar portions 41a, 41b each comprise bearings 48. The bearings are rotatably mounted about said bar portions, and are fastened in translation relative to said bar portions.

The second load support 40 further comprises loads 45 allowing to apply a constant load of a determined value to the rod 31 of the fork.

The weight of the masses is adjusted in order to impose a determined force to the lateral teeth 12 allowing to maintain the lateral teeth 12 bearing against the upper surface 71 of the test piece during the test.

The means for fastening the rod of the second load support to the rod of the fork also comprises a cylindrical part 46 which extends from the lower surface of the clamp 42, around the upper portion 34 of the fork rod. The cylindrical part 46 is advantageously provided with a bore 83 in which the upper portion 34 of the rod is received, and which thus allows ensuring the alignment of the rod 31 with the axis A, and improving the guiding of said rod 31 in the tube 11 without friction.

The cylindrical part 46 is provided with a groove 47 configured to receive the spout 54 of the upper arm 53 of the measuring device 50 which will be described in more detail below.

The cylindrical parts 26 and 46 of the first and second load support 20 and 40 form therebetween a space 84 traversed by the rod 31.

According to the embodiment shown in FIGS. 4 and 5, the second load support 40 is a balancer load support, in which the loads 45 are in the form of masses positioned at the free ends of the bar 41 to balance the balancer.

When the first and the second load support 20 and 40 are balancers, the characteristics of each of their respective masses, such as their shape, their mounting on the balancers, particularly the length of the rod portions between the central portion of the rod and the masses, as well as their load, are adjusted so as to maintain the center of gravity of the balancers with the measuring device 50 in the axis A of the tube 11 and the rod 31, so that there is no moment in the tube. In other words, any rotation of the tube 11 and of the rod 31 around the axis A is impossible. As a result, any parasitic friction between these different elements is avoided.

The masses 25, 45 of each of the balancers can thus have identical characteristics and characteristics which are different from one another. In FIGS. 4 and 5, one of the masses of each of the balancers, located on the left side of the tube 11 in the plane of the sheet, is smaller than the other in order to compensate for the weight of the measuring device 50 also positioned on the left of the tube 11.

The measuring device 50 comprises a sensor 55, as well as two arms 51, 53 which extend from the sensor. The lower arm 51 is connected to the upper portion 18 of the tube 11 via its spout 52 inserted into the groove 27 of the cylindrical part 26 of the first load support 20. The upper arm 53 is connected to the upper portion 34 of the rod 31 via its spout 54 inserted into the groove 47 of the cylindrical part 46 of the second load support 40.

The distance ΔB between the arms 51, 53 of the measuring device is therefore depending on the space between the load supports 20, 40. This distance ΔB varies during the deformation of the exposed surface of the test piece, correspondingly to the variation of the differential ΔL between the end of the central tooth 32 and the lower end of the lateral teeth 12.

Measuring the variation of the distance ΔB between the arms of the measuring device 50 during the bending deformation test then allows determining the value of the deformation of the exposed surface of the test piece depending on the force applied to the test piece by the testing machine. This aspect will be explained in more detail later in this text.

The measurement system of the invention thus allows to move away the measurement sensor, positioned in the state of the art directly on the test piece or in its vicinity, which avoids any degradation of the sensor, and allows performing bending deformation tests under high temperature, the temperature being selected according to the material to be examined.

In addition, a single sensor is sufficient, against two usually, and this sensor only measures the variation in curvature. Thus, it is possible to provide a sensor with a small stroke in order to have a high measurement accuracy (accuracy less than a micrometer).

The measuring device is preferably a strain gage, comprising the sensor 55 and the two arms 51, 53. Said arms 51, 53 extend from the sensor 55, and are parallel to each other when the distance between the end of the central tooth and the ends of the lateral teeth is zero, that is to say when the test piece does not undergo any deformation.

Preferably, the measurement system 1 further comprises a structure 60.

Figure 7:
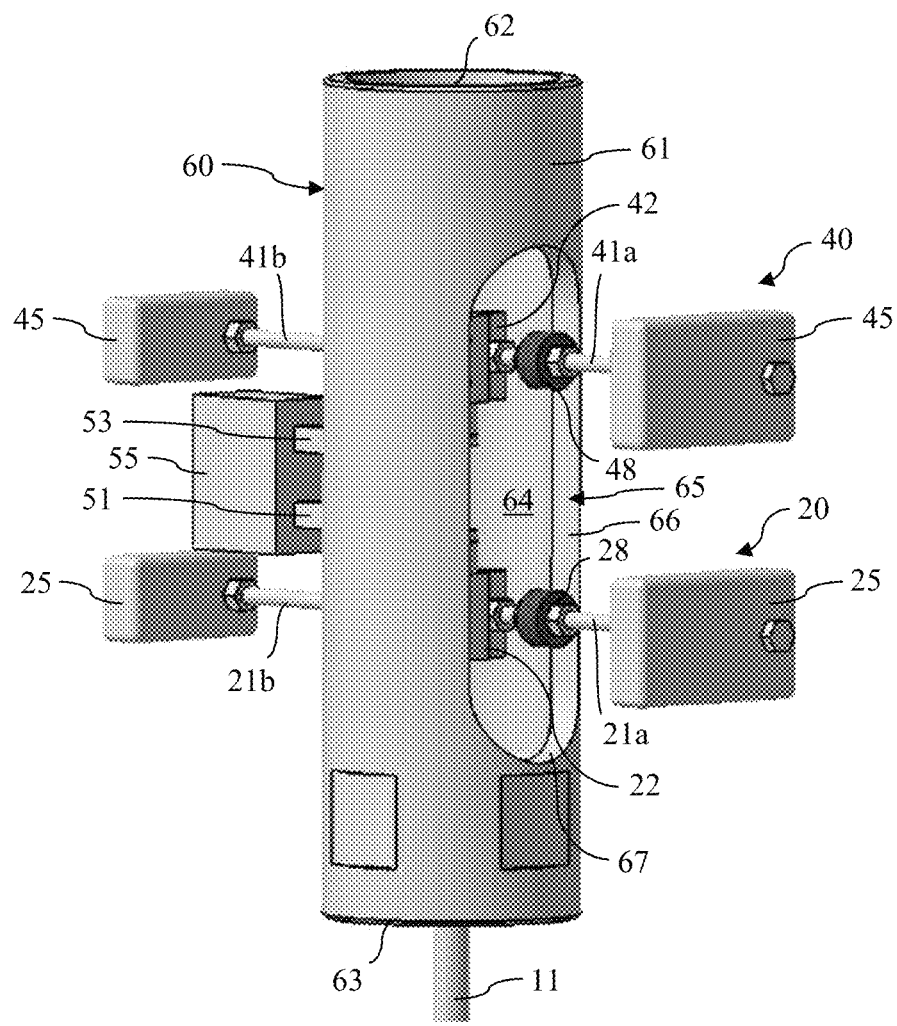
FIG. 7, a perspective view of the structure partially enclosing the measurement system.

With reference to FIG. 7, the structure 60 is in the form of a hollow tube, comprising a wall 61 which extends around the axis A of the tube 11. The wall defines an internal volume delimited by an upper opening 62 provided in the upper portion of the structure, and by a lower opening 63 provided in the lower portion of the structure.

Figure 9:
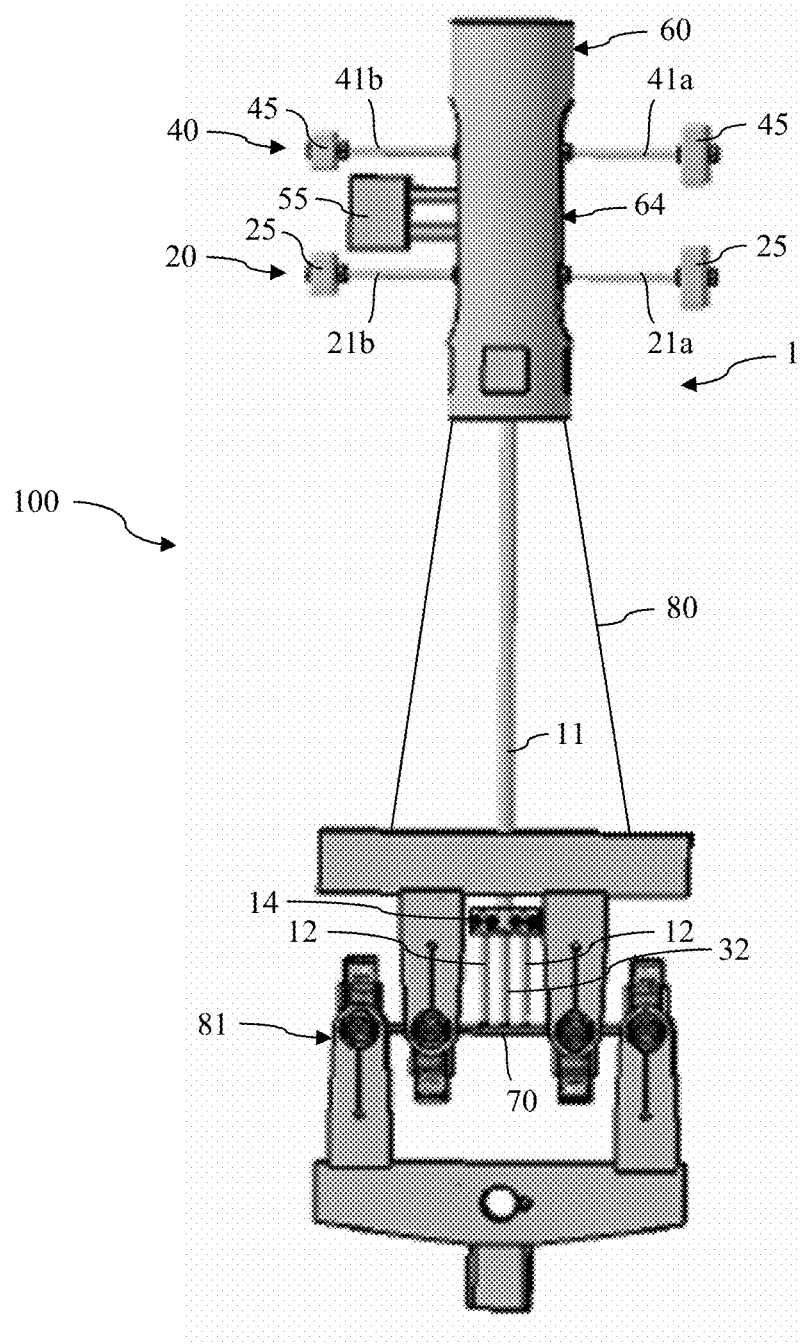
FIG. 9, a side view of a deformation test system, comprising the measurement system connected to a four-point mounting.

With reference to FIG. 9, the upper portion of the structure serves as an interface connected to the force cell of the testing machine (not shown), and the lower portion of the structure serves as an interface connected to the four-point mounting 80 via a mooring line 81. The structure 60 thus extends the mooring line, and ensures the transfer of the mechanical forces between the testing machine and the four-point mounting 80.

According to one embodiment, the measurement system comprises a centering plug 68 positioned in the mooring line 81, at the lower opening 63 of the structure, so as to at least partially close said lower opening.

The centering plug 68 has a cylindrical shape, and comprises an opening in its center forming a passage in which the tube 11 extends. The centering plug thus allows guiding the tube 11 in the mooring line 81 along the axis A.

The internal volume of the structure 60 serves as a housing for a portion of the measurement system 1.

The structure 60 thus contains, in its internal volume, the upper portions of the tube 11 and the rod 31, as well as the means 22, 42 for fastening the load supports 20, 40 to the tube and the rod.

The wall 61 is advantageously provided with two through orifices 64 positioned opposite one another. The orifices 64 each form a passage for the bar portions 21a, 21b, and 41a, 41b of the load supports 20 and 40, which extend through said orifices 64 to the outside of the structure 60. The loads 25, 45 of the load supports 20 and 40 are thus arranged outside the structure.

Preferably, the orifices 64 also form a passage for the arms 51, 52 of the measuring device 50, which extend through said orifices 64 to the outside of the structure 60. The sensor 55 of the measuring device is thus arranged outside the structure.

The two orifices 64 are each delimited by an edge 65 of the wall. The edge 65 of each of the orifices comprises two longitudinal portions 66 facing each other which extend in the length of the structure parallel to the axis A, and two lateral portions 67 facing each other which connect the two longitudinal potions.

Figure 8:
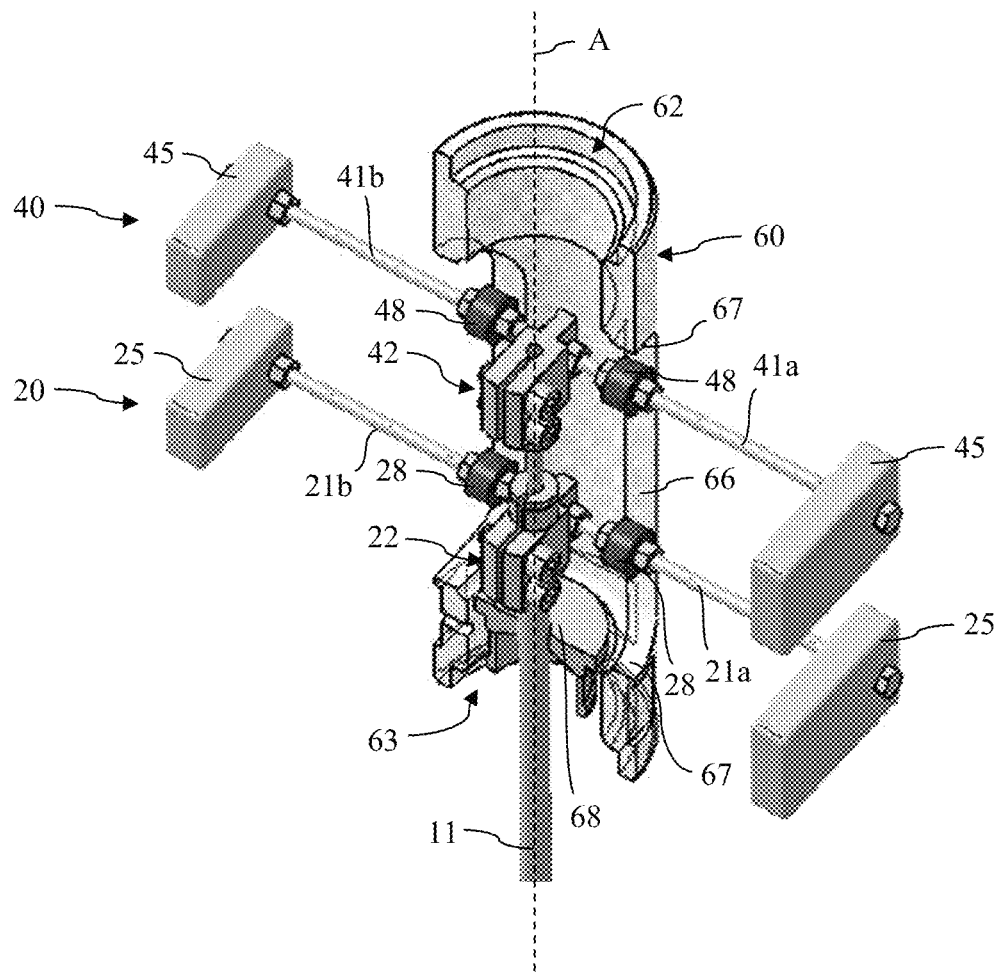
FIG. 8, a perspective and sectional view of the structure of FIG. 7.

According to the embodiment shown in FIGS. 7 and 8, the orifices 64 have an oblong shape, the longitudinal portions 66 of which are very long compared with that of their curved lateral portions 67.

The longitudinal portions 66 of the orifices 64 form a path on which the bearings 28, 48 of the lower and upper load supports 20, 40 are capable of displacing.

More specifically, the bearings 28 of the lower load support 20 are located facing the edges 65 of the orifices 64 and are configured to roll along the longitudinal portions 66 of said orifices when the tube 11 displaces in translation along the axis A.

The bearings 48 of the upper load support 40 are located facing the edges 65 of the orifices 64 and are configured to roll along the longitudinal portions 66 of said orifices when the rod 31 displaces in translation along the axis A.

The longitudinal portions 66 of the orifices 64 of the structure thus allow guiding the tube 11 and the rod 31 according to an axial translational movement along the axis A, and act as a stop for the bearings 28, 48 which prevents any rotation of the tube 11 and the rod 31 around the axis A. Consequently, the load supports 20, 40 as well as the measuring device 50 are forced to displace, with the tube 11 and the rod 31, only in a translational movement along the axis A. Any other movement, particularly of rotation around the axis A, is avoided, which improves the accuracy of the measurement.

An advantage of the oblong-shaped orifices 64 is that at the end of the axial displacement of the rod 31 or the tube 11, when the bearings 28, 48 are located in the proximity of the lateral portions 67, the curved shape of said lateral portions 67 conforms to those of the bearings, which allows the bearings to roll on the curved lateral portions of the edges, and thus to accompany the end of displacement of the tube 11 or of the rod 31 without forming a clear stop. The accuracy of the measurement is then improved.

The operation of the measurement system 1 will now be described.

In the initial state, before carrying out the test, the test piece 70 is at rest and extends in a substantially linear manner between the four points of the mounting 80.

The fork bears against the useful central portion of the test piece. In detail, the central tooth 32 is maintained bearing against the upper surface 71 of the test piece thanks to the force imposed by the second load support 40 on the bar 21 of the fork. The lateral teeth 12 are maintained in abutment against the upper surface 71 of the test piece thanks to the force imposed by the first load support 20 on the tube and consequently on the lateral teeth 12.

The distance ΔL between the lower end of the central tooth 32 and the lower end of the lateral teeth 12, denoted $\Delta L_0$, is zero. This difference $\Delta L_0$ corresponds to an initial value denoted $\Delta B_0$ of the distance $\Delta B$ between the arms 51, 53 of the measuring device 50.

A mechanical constraint is applied on the test piece via the four-point mounting 80, by means of the force cell of the testing machine. The mechanical constraint is transferred from the testing machine to the four-point mounting via the structure 60.

The application of a mechanical constraint on the test piece 70 causes a deformation of the test piece, and particularly a bending deformation of its upper surface 71.

The useful portion of the test piece in a deformed state is shown in FIG. 3.

As the test piece 70 deforms, the tube 11 and the lower load support 20 displace in translation along the axis A downwards due to the force imposed by the loads on said tube, and thus follow the deformation of the upper surface 71 of the test piece. The bearings 28 roll along the longitudinal walls 66 of the openings 64 of the structure 60, which ensures the translational guidance of the tube 11 and of the first load support 20 while preventing any rotational movement around the axis A. The ends of the lateral teeth 12 thus remain bearing against the upper surface of the test piece during the deformation of said surface.

The lower arm 51 of the measuring device 50, connected to the tube 11, displaces in translation along the axis A integrally with said tube.

The rod 31 of the fork and the second load support 40 displace in translation along the axis A downwards due to the force imposed by the loads on said rod 31. The bearings 48 roll along the longitudinal walls 66 of the openings 64 of the structure, which ensures the translational guidance of the rod 31 and the second load support 40 while preventing any rotational movement about the axis A. The end of the central tooth 32 thus remains bearing against the upper surface of the test piece during the deformation of said surface.

The upper arm 53 of the measuring device 50, connected to the rod 31 of the fork, displaces in translation along the axis A integrally with said rod.

As illustrated in FIG. 3, the useful portion 74 of the test piece in a deformed state has a V-shaped profile. Indeed, the upper surface 71 of the test piece is more compressed at the central bearing area 72 than at the lateral bearing areas 73.

Consequently, the end of the central tooth 32 is lower than that of the lateral teeth 12. Therefore, the distance $\Delta L$ between the central tooth 32 and the lateral teeth 12 increases compared to the initial state, and is equal to $\Delta L_1$. This distance $\Delta L_1$ corresponds to a corresponding variation in the distance $\Delta B$ between the arms of the measuring device, denoted $\Delta B_1$.

As the test piece deforms, the surface of the test piece deforms even more at the central bearing area 72 compared to the lateral bearing areas 73. Consequently, the rod 31 continues to displace relative to the tube 11. The lower end of the central tooth 32 then protrudes even more compared to the ends of the lateral teeth 12. Consequently, $\Delta L$ increases.

An increase in $\Delta L$ induces a corresponding increase in $\Delta B$, the measurement of which gives the bending deformation of the exposed surface of the test piece.

The simultaneous bearing of the central tooth 32 and the lateral teeth 12 on the upper surface 71 of the test piece, maintained thanks the constant forces applied by the load devices 20, 40, allows obtaining an accurate and reliable measurement of the bending deformation of said surface.

The invention claimed is:

1. A system (1) for measuring a bending deformation of a surface of a material, adapted to cooperate with a bending test machine provided with a four-point bending mounting (80) allowing to deform a test piece (70) of said material, said measurement system (1) comprising:
   a first portion comprising:
      lateral teeth (12) each comprising an end (13), configured to bear against an upper surface (71) of the test piece via said ends (13) in two respective lateral bearing areas (73),
      a first load support (20) connected to the lateral teeth (12), configured to apply to said lateral teeth (12) a constant force oriented towards the test piece (70),
      the first portion being movable in translation along an axis (A) perpendicular to the plane of the upper surface (71) of the test piece,
   a second portion comprising:
      a central tooth (32) parallel to the lateral teeth (12) comprising an end (33), configured to bear against the upper surface (71) of the test piece via said end (33) in a central bearing area (72) arranged between the lateral bearing areas (73),
      a second load support (40) connected to the central tooth (32), configured to apply to said central tooth (32) a constant force oriented towards the test piece (70),
      the second portion being movable in translation relative to the first portion along an axis parallel to the axis (A) of the first portion,
   a measuring device comprising a deformation sensor (50), the deformation sensor comprising:
      a first arm (51) connected to the first portion,
      a second arm (53) connected to the second portion,
      wherein the first arm (51) and the second arm (53) are separated from each other by a variable distance ($\Delta B$), the measuring device being configured to measure said variable distance ($\Delta B$) corresponding to a distance ($\Delta L$) between the end (33) of the central tooth (32) and the ends (13) of the lateral teeth (12) during the deformation of the test piece.

2. The measurement system according to claim 1, wherein the end (13) of the lateral teeth (12) and/or the end (33) of the central tooth (32) bearing against the upper surface (71) of the test piece (70) are beveled.

3. The measurement system according to claim 1, wherein:
   the lateral teeth (12) are connected to a hollow tube (11) which extends along an axis (A) perpendicular to the plane of the upper surface (71) of the test piece,
   the central tooth (32) is in the form of a rod (31) coaxial with the tube (11), capable of protruding axially out of the tube from a lower end (18) of said tube, the central tooth (32) being configured to displace in translation inside said tube (11).

4. The measurement system according to claim 3, wherein:
   the first load support (20) is connected to the tube (11),
   the second load support (40) is connected to an upper portion (34) of the rod (31) capable of protruding axially out of the tube (11) from an upper end (18) of said tube,
   the first arm (51) of the deformation sensor (50) is connected to the tube (11),
   the second arm (53) of the deformation sensor (50) is connected to the upper portion (34) of the rod.

5. The measurement system according to claim 1, wherein:
   the first load support (20) comprises a balancer comprising a bar (21) which extends perpendicularly to the axis of translation (A) of the first portion, and masses (25) mounted at the ends of the bar (21), the second load support (40) comprises a balancer comprising a bar (41) which extends perpendicularly to the axis of translation (A) of the second portion, and masses (45) mounted at the ends of the bar (41), and in which the masses (25, 45) of the first load support (20) and the second load support (40) are configured so that the center of gravity of the balancers and the deformation sensor (50) is aligned with the central tooth (32).

6. The measurement system according to claim 5, further comprising a hollow structure (60) comprising a side wall (61) delimiting an internal volume open in two orifices (62, 63) located at an upper portion and lower portion of the structure, said structure (60) being configured to at least partially house the first portion and the second portion of the system (1) in its internal volume, and the upper portion of the structure (60) being configured to be connected to a bending surface deformation machine and the lower portion of the structure being configured to be connected to the four-point bending mounting (80).

7. The measurement system according to claim 6 wherein:
The side wall (61) of the structure (60) comprises two through openings (64) facing one another, delimited by an edge (65) of the wall (61), and through which extend the balancers of the first load support (20) and of the second load support (40), the balancer of the first load support (20) comprises bearings (28) configured to roll along the edges (65) of the openings (64) when the first portion displaces, the balancer of the second load support (40) comprises bearings (48) configured to roll along the edges (65) of the openings (64) when the second portion displaces.

8. The measurement system according to claim 6, further comprising a centering plug (68) arranged in the opening (63) of the lower portion of the structure (60), the centering plug (68) being configured to guide the first portion in translation.

9. The measurement system according to claim 1, wherein the first portion comprises a support (14) comprising two support portions (16, 17) held together so as to enclose a portion of the lateral teeth (12).

10. The measurement system according to claim 1, wherein the measuring device comprises a strain gage comprising the first arm (51) and the second arm (53), said first and second arms (51, 53) being parallel to each other when the distance ($\Delta L$) between the end (33) of the central tooth (32) and the ends (13) of the lateral teeth (12) is zero.

11. A system for testing the bending deformation of a surface of a material in the form of a test piece, comprising:
a bending test machine provided with a four-point bending mounting (80), said testing machine being configured to apply a bending deformation constraint to the test piece (70) by means of the four-point mounting (80) in order to deform the test piece (70) in bending,
a measurement system (1) according to any one of the preceding claims, allowing to measure the surface bending deformation of the upper surface (71) of the test piece (70) according to the deformation constraint applied by the testing machine.

\* \* \* \* \*